United States Patent
Stroila et al.

(10) Patent No.: US 12,452,630 B2
(45) Date of Patent: Oct. 21, 2025

(54) VEHICLE MOBILITY PATTERNS BASED ON USER LOCATION DATA

(71) Applicant: Allstate Insurance Company, Northbrook, IL (US)

(72) Inventors: Matei Stroila, Chicago, IL (US); Narayanan Alwar, Bloomingdale, IL (US); Timothy W. Gibson, Barrington, IL (US); Sunil Chintakindi, Naperville, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/367,797

(22) Filed: Sep. 13, 2023

(65) Prior Publication Data

US 2024/0073647 A1    Feb. 29, 2024

Related U.S. Application Data

(63) Continuation of application No. 17/404,697, filed on Aug. 17, 2021, now Pat. No. 11,800,323.

(51) Int. Cl.
    H04W 4/029    (2018.01)
    G06F 16/29    (2019.01)
    (Continued)

(52) U.S. Cl.
    CPC .......... *H04W 4/029* (2018.02); *G06F 16/29* (2019.01); *H04W 4/022* (2013.01); *H04W 64/006* (2013.01)

(58) Field of Classification Search
    CPC ..... H04W 4/029; H04W 88/02; H04W 4/027; H04W 4/08; H04W 4/38; H04W 48/18; H04W 68/00; H04W 88/06
    See application file for complete search history.

(56) References Cited

U.S. PATENT DOCUMENTS

| | | | |
|---|---|---|---|
| 8,275,649 B2 | 9/2012 | Zheng et al. | |
| 10,831,827 B2 | 11/2020 | Gifford et al. | |

(Continued)

OTHER PUBLICATIONS

Giannotti Fosca et al: "Understanding Human Mobility With Big Data", Jul. 3, 2016 (Jul. 3, 2016), Sat 2015 18th International Conference, Austin, TX, USA, Sep. 24-27, 2015; [Lecture Notes Incomputer Science; Lect.Notes Computer], Springer, Berlin, Heidelberg, pp. 208-220, Xp047364876, ISBN: 978-3-540-74549-5 [Retrieved On Jul. 3, 2016].

(Continued)

*Primary Examiner* — Kwasi Karikari

(57) ABSTRACT

Methods, computer-readable media, software, and system may generally build and quantify mobility patterns based on user location data, both at an individual level and an aggregate level. The system may determine the origin and destination data for each trip taken by a user. The system may then define areas of mobility using a mobility graph built from the data. The graph may include nodes and edges. In some examples, the nodes are constructed from the origins and destinations of the trajectories using spatial clustering techniques. Further, the edges between nodes may be constructed based on the trips between them, such as two nodes are connected by an edge if there is at least one trip between them. The edges may be given different weights based on trip frequencies. The system may then determine a region of mobility using the generated mobility graph and data clustering techniques.

20 Claims, 10 Drawing Sheets

(51) Int. Cl.
 *H04W 4/021* (2018.01)
 *H04W 64/00* (2009.01)

(56) References Cited

U.S. PATENT DOCUMENTS

| | | |
|---|---|---|
| 2011/0208425 A1 | 8/2011 | Zheng et al. |
| 2014/0089101 A1 | 3/2014 | Meller |
| 2015/0242899 A1 | 8/2015 | Farhi |
| 2016/0091879 A1* | 3/2016 | Marti ................ H04L 12/2816 700/275 |
| 2017/0286845 A1* | 10/2017 | Gifford ............... G06F 16/9024 |
| 2022/0292606 A1* | 9/2022 | Chow ..................... G06N 3/04 |

OTHER PUBLICATIONS

Lin M., et al., "Mining GPS Data for Mobility Patterns: A Survey," Pervasive and Mobile Computing, vol. 12, Jun. 2014, pp. 1-16.
The International Search Report and The Written Opinion of The International Searching Authority for International application No. PCT/US2022/040591 filed Aug. 17, 2022 (12 pages).

* cited by examiner

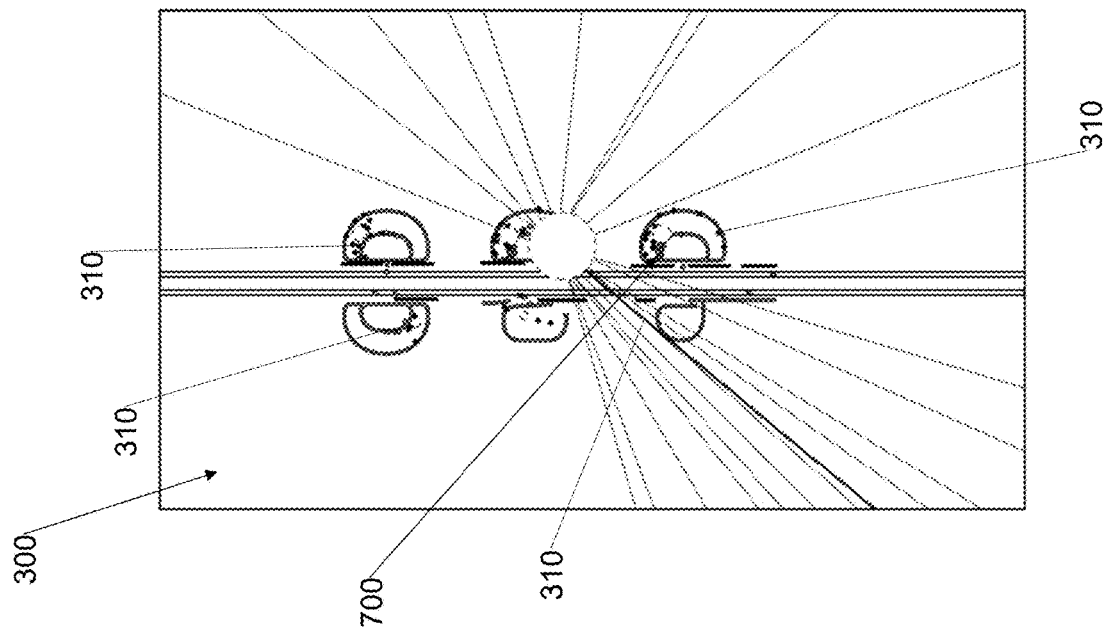
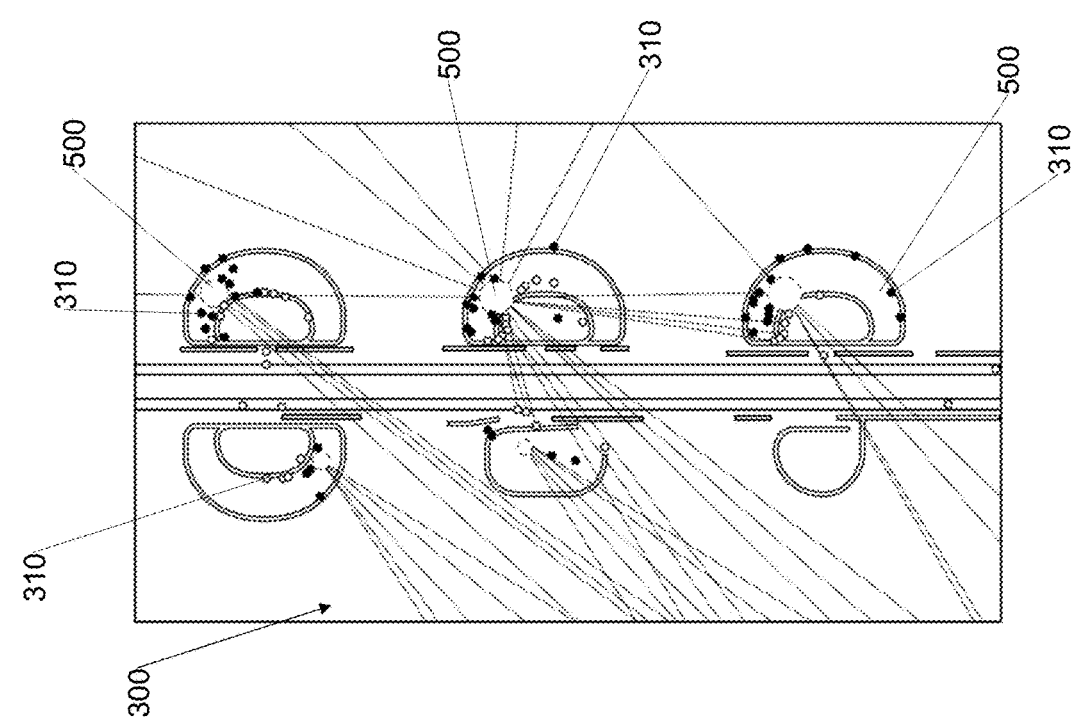
FIG. 7B
FIG. 7A

VEHICLE MOBILITY PATTERNS BASED ON USER LOCATION DATA

CROSS-REFERENCE TO RELATED APPLICATIONS

The present application claims priority to U.S. patent application Ser. No. 17/404,697 filed on Aug. 17, 2021, which is incorporated by reference in its entirety herein.

FIELD OF ART

Aspects of the disclosure relate generally to mobility patterns, more specifically, building and quantifying mobility patterns based on user location data.

BACKGROUND

In today's connected world, location data is instrumental to offering a variety of services to consumers. The location data from consumers is used in a wide variety of ways to offer services that are relevant to that industry. Some of the services include real time location-based services, navigation services, safety alerts and location-based advertising.

Aspects described herein may address these and other problems, and generally building and quantifying mobility patterns based on user location data, specifically defining a mobility region of a user or collection of users derived from the origins and destinations of their travel over a period. Aspects described herein may be utilized for the insurance industry to understand customer's mobility region and the associated risks, but may be also extendable for several other industries and applications.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In some aspects, the system may include a system comprising: a processor; a display with a user interface; and a memory unit storing computer-executable instructions. The computer-executable instruction, which when executed by the processor, may cause the system to: receive and determine location data that includes a plurality of trips by a user between a plurality of origins and a plurality of destinations; aggregate the location data; cluster the aggregated location data using one or more hierarchical cluster levels; form, by a machine learning algorithm operating on the processor, one or more location clusters into a plurality of nodes from the aggregated location data and based on the one or more hierarchical cluster levels; generate a region of mobility based on the mobility graph; and display, via the user interface, the region of mobility for the user. The mobility graph may include the plurality of nodes and a plurality of edges. The plurality of nodes may be defined from the one or more location clusters. The plurality of edges may be defined by each of the plurality of trips between one of the plurality of origins and one of the plurality of destinations. The region of mobility may be a homogeneous spatial region based on a specific location included with the plurality of nodes and the plurality of edges that meet a location criteria.

According to some embodiments, the location data may be received from one or more sensors from a mobile device for the user. The computer-executable instruction, which when executed by the processor, may cause the system to: detect and filter one or more noise location data from the aggregated location data based on environmental noise and inaccuracies from the location data. The one or more hierarchical cluster levels may include one or more of the following: a destination-based cluster level, a spatial aggregation layer cluster level, a temporal cluster level, a point of interest based cluster level, or a regional cluster level. Each of the plurality of nodes may include a node size that defines a location frequency that the user visits a specific location associated with each of the plurality of nodes. The node size may be larger when the location frequency is more frequent and the node size may be smaller when the location frequency is less frequent. The plurality of edges may include an edge weight based on a trip frequency. The edge weight may be larger when the trip frequency is more frequent and the edge weight may be smaller when the trip frequency is less frequent. The location criteria may include one or more of: a frequency of visit, a time of visit, a length of stay at each specific location, or a type of location visited. The region of mobility may be a home mobility region defined as the region of mobility around a home location of the user. The region of mobility may be a work mobility region defined as the region of mobility around a work location of the user. The region of mobility may be a point of interest mobility region defined as the region of mobility around a specific point of interest for the user. The computer-executable instruction, which when executed by the processor, may cause the system to: determine a risk index for the user based on the region of mobility of the user, wherein the risk index is used for insurance pricing for the user.

Additionally, a variety of aspects described herein provide a computer-implemented method and/or one or more non-transitory computer-readable media storing instructions that, when executed by a computing device, cause the computing device to: receive and determine, by a processor operating on the computing device, location data that includes a plurality of trips by a user between a plurality of origins and a plurality of destinations; aggregate, by the processor, the location data; detect and filter, by the processor, noise location data from the aggregated location data, wherein the noise location data comprises environmental noise data and inaccuracies from the location data; cluster, by the processor, the aggregated location data using one or more hierarchical cluster levels; form, by a machine learning algorithm operating on the processor, one or more location clusters into a plurality of nodes from the aggregated location data and based on the one or more hierarchical cluster levels; generate, by the processor, a mobility graph; generate, by the processor, a region of mobility based on the mobility graph; determine, by the processor, a risk index for the user based on the region of mobility of the user; and display, by the processor via a user interface connected to the processor, the region of mobility and the risk index for the user. The location data may be received from one or more sensors from a mobile device for the user. The one or more hierarchical cluster levels may include one or more of the following: a destination-based cluster level, a spatial aggregation layer cluster level, a temporal cluster level, a point of interest based cluster level, or a regional cluster level. The mobility graph may include the plurality of nodes and a plurality of edges. The plurality of nodes may be defined from the one or more location clusters. The plurality of edges may be defined by each of the plurality of trips between one of the plurality of origins and one of the plurality of destinations. Each of the plurality of nodes may include a node weight that defines a location frequency that the user visits a specific location associated with each of the plurality of nodes. The node weight may be larger when the location frequency is more frequent and the node weight may be smaller when the location frequency is less frequent. Each of the plurality of edges may include an edge weight based on a trip frequency. The edge weight may be larger when the trip frequency is more frequent and the edge weight may be smaller when the trip frequency is less frequent. The region of mobility may be defined as a convex hull of the plurality of nodes with the node weight above a node threshold and the plurality of edges with the edge weight above an edge threshold. The risk index may be used for insurance pricing for the user.

The methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims. These features, along with many others, are discussed in greater detail below.

BRIEF DESCRIPTION OF THE DRAWINGS

The present invention is illustrated by way of example and is not limited by the accompanying figures in which like reference numerals indicate similar elements and in which:

FIGS. 7A and 7B are diagrams illustrating a mobility graph showing points of interest (POI) clustering of the mobility pattern system in accordance with one or more aspects described herein.

DETAILED DESCRIPTION

In accordance with various aspects of the disclosure, methods, computer-readable media, software, and appara-tuses are disclosed for determining, based on historical vehicle supply data, and based on historical vehicle demand data, that an expected vehicle demand will exceed an expected vehicle supply, and for sending, to at least one user, a request to provide a vehicle for sharing on the determined date.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Aspects of the disclosure address one or more of the issues mentioned above by disclosing methods, computer readable storage media, software, systems, and apparatuses for building and quantifying mobility patterns based on user location data, both at an individual level and an aggregate level. The system may determine the origin and destination data for each trip taken by a user. The system may then define areas of mobility using a mobility graph built from the data. The graph may include nodes and edges. In some examples, the nodes are constructed from the origins and destinations of the trajectories using spatial clustering techniques. Further, the edges between nodes may be constructed based on the trips between them, such as two nodes are connected by an edge if there is at least one trip between them. The edges may be given different weights based on trip frequencies. The system may then determine a region of mobility using the generated mobility graph and data clustering techniques.

Figure 1:
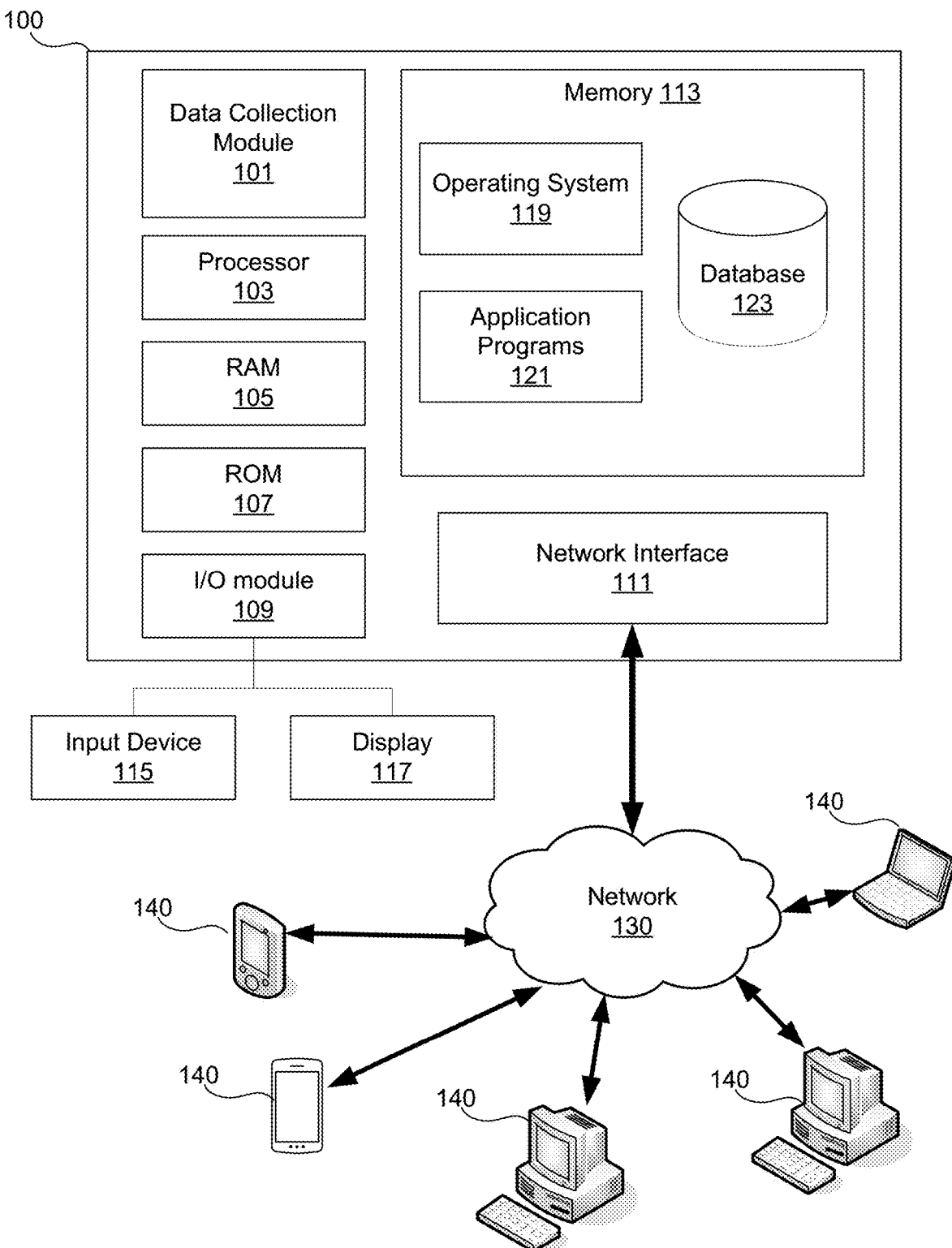
FIG. 1 illustrates an example computing device that may be used in accordance with one or more aspects described herein.

In one or more arrangements, aspects of the present disclosure may be implemented with a computing device. FIG. 1 illustrates a block diagram of an example mobility pattern server 100 that may be used in accordance with aspects described herein. The mobility pattern server 100 may be a server, personal computer (e.g., a desktop computer), laptop computer, notebook, tablet, smartphone, home management devices, home security devices, smart appliances, etc. The mobility pattern server 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware and/or applications used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, mobility pattern server 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the mobility pattern server 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113. Processor 103 may include one or more computer processing units (CPUs), graphical processing units (GPUs), and/or other processing units such as a processor adapted to perform computations associated with machine learning and machine learning algorithms.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100; however, they may be within the same structure. On some computing devices 100, the input device 115 may be operated by users to interact with the data collection module 101, including providing user information and/or preferences, account information, vehicle sharing requests and/or offers, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the computing device 100 to perform various functions. For example, memory 113 may store software used by the computing device 100, such as an operating system 119 and application programs 121, and may include one or more associated databases 123.

Memory 113 may store software for configuring mobility pattern server 100 into a special purpose computing device in order to perform one or more of the various functions discussed herein. Memory 113 may store operating system software 119 for controlling overall operation of the mobility pattern server 100 or application programs 121 for instructing mobility pattern server 100 to perform aspects discussed herein.

The network interface 111 may allow the computing device 100 to connect to and communicate with a network 130. The network 130 may be any type of network, including a local area network (LAN) and/or a wide area network (WAN), such as the Internet, a cellular network, or a satellite network. Through the network 130, the computing device 100 may communicate with one or more other mobile computing devices 140, such as laptops, notebooks, smartphones, cell phones, tablets, personal computers, in-vehicle devices, servers, vehicles, home management devices, home security devices, smart appliances, etc. The mobile computing devices 140 may be configured to operate software and/or applications. The mobile computing devices 140 may also be configured in a similar manner as computing device 100. In some embodiments the computing device 100 may be connected to the mobile computing devices 140 to form a "cloud" computing environment.

Devices 140 may have similar or different architecture as described with respect to the mobility pattern server 100. Those of skill in the art will appreciate that the functionality of the mobility pattern server 100 (or device 140) as described herein may be spread across multiple data processing devices, for example, to distribute processing load across multiple computers, to segregate transactions based on geographic location, user access level, quality of service (QoS), etc. For example, the mobility pattern server 100 and devices 140, and others may operate in concert to provide parallel computing features in support of the operation of operating systems 119 and/or application programs 119.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other mobile computing devices 140.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
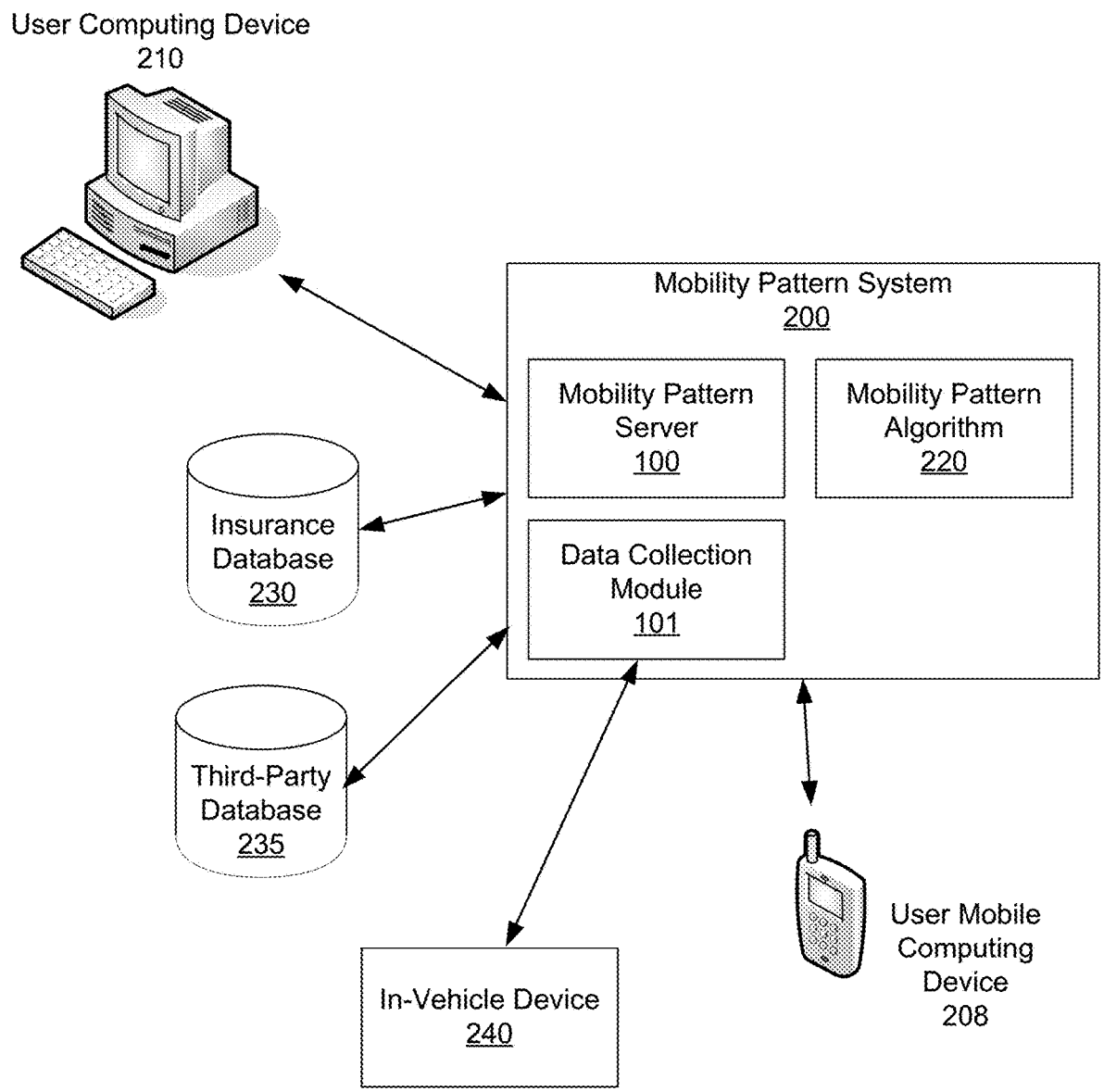
FIG. 2 is a diagram illustrating a mobility pattern system in accordance with one or more aspects described herein.

FIG. 2 is a diagram illustrating a mobility pattern system 200 in accordance with one or more aspects described herein. In some instances, the mobility pattern system 200 may include one or more computing devices, such as mobility pattern server 100 or mobile computing devices 140, or aspects similar to those discussed above with respect to mobility pattern server 100 and mobile computing devices 140. As further illustrated in FIG. 2, the mobility pattern system 200 may include, but not be limited to, the mobility pattern server 100, the data collection module 101, and a mobility pattern algorithm 220.

The mobility pattern system 200 may include a mobility pattern algorithm 220 that may execute or operate on the mobility pattern server 100. The mobility pattern algorithm 220 may be a machine learning algorithm. The mobility pattern system 200 may utilize a mobility pattern algorithm 220 for forming the one or more location clusters in a plurality of nodes and a plurality of edges from aggregated location data from a user or a group of users. The mobility pattern algorithm 220 may provide data munging, parsing, and machine learning models to help determine a resale value of a vehicle. The mobility pattern algorithm 220 may utilize one or more of a variety of machine learning architectures known and used in the art. These architectures can include, but are not limited to, linear regression, random forest, decision trees, k-nearest neighbors, support vector machines (SVM), logistical regression, k-means clustering, association rules, neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning architectures can be utilized, more specific machine learning architectures when available, and general machine learning architectures at other times can be used. Additionally, the mobility pattern algorithm 220 may use semi-supervised learning and/or reinforcement learning.

The mobility pattern system 200 may collect location data and additional information from a user through various channels, such as via a user mobile computing device 208, or via a user computing device 210 (e.g., via one or more public or private networks). The mobile computing device 208 and the user computing device 210 may be similar to and include the one or more mobile computing devices 140, such as laptops, notebooks, smartphones, cell phones, tablets, personal computers, in-vehicle devices, servers, vehicles, home management devices, home security devices, smart appliances, etc.

The mobility pattern system 200 may be connected to an in-vehicle device 240. The present disclosure may utilize an in-vehicle device 240 to collect and provide telematics information as known and used in the art on a vehicle. The in-vehicle device 240 may include a processor with a display or graphical interface that receives and/or collects driving data and/or telematics information and provides additional information based on the driving data. The driving data, GPS information, and/or telematics information may include, but not be limited to: location, instantaneous velocity, average velocity, route, destination, etc. The in-vehicle device 240, which may be configured to receive real-time vehicle data, may provide a driver or the vehicle owner with visual and/or audible in-vehicle information. The in-vehicle device 240 may process real-time (i.e., near real-time) data and then display the processed information in a meaningful way on a display or graphical user interface (GUI). The in-vehicle device 240 may receive and/or collect critical driving data and store summary information for and/or about the driver.

The in-vehicle device 240 may communicate with the data collection module 101 or on-board diagnostics port of a vehicle to collect the driving data. In another exemplary embodiment, the in-vehicle device 240 may acquire the driving data directly from the device, such as a mobile device, smart phone, tablet computer, or vehicle navigation system via a built-in accelerometer and/or a Global Positioning System (GPS). In another exemplary embodiment, the in-vehicle device 240 may be one in the same device as a mobile device, smart phone, tablet computer, or vehicle navigation system via a built-in accelerometer and/or a Global Positioning System (GPS) to acquire the driving data.

In some arrangements, the mobility pattern system 200 may be connected to an insurance system, such as insurance database 230. The insurance database 230 may include insurance information that may reside on an insurance server regarding information about a vehicle owner or particular user, current insurance policies, current insurance pricing, previous accidents, previous claims, information about other users with similar characteristics, etc. The insurance database 230 may be configured to utilize the insurance information known about the vehicle owner or a particular user and insurance information about users with similar characteristics to provide additional information to the mobility pattern system 200.

In some arrangements, the mobility pattern system 200 may be connected to a third-party database 235. The third-party database 235 may include other information that may be utilized by the mobility pattern system 200 and/or the mobility pattern server 100. For example, the third-party database 235 may include mapping information and/or risk map information.

Generally, a system and method may define a mobility region of a user or collection of users derived from the origins and destinations of their travel over a period. The system and methods may determine the origin and destination data for each trip taken by the user. The system and methods may build and quantify mobility patterns based on user location data both at individual level and at aggregate level. The system and methods may consist of defining areas of mobility using a mobility graph built from this data. A mobility graph may consist of nodes and edges. The nodes may be constructed from the origins and destinations of the trajectories using spatial clustering techniques and other clustering techniques described herein. The edges between nodes may be constructed based on the trips between them (two nodes are connected by an edge if there is at least one trip between them) and are given weights based on trip frequency. For example, the edge weight may be bigger, thicker, or larger when the trip frequency is more frequent or higher and the edge weight may be smaller or thinner when the trip frequency is less frequent or lower.

An area of mobility may be defined as a homogenous spatial region that includes collections of nodes and edges that satisfies certain location criteria. The location criteria could be defined based on the frequency of visit, time of visit, length of stay at each location or the type of locations visited. These parameters may enable the systems and methods to determine several regions of mobility that can be defined based on the insights to be derived for a service offering, such as insurance processing.

Figure 3:
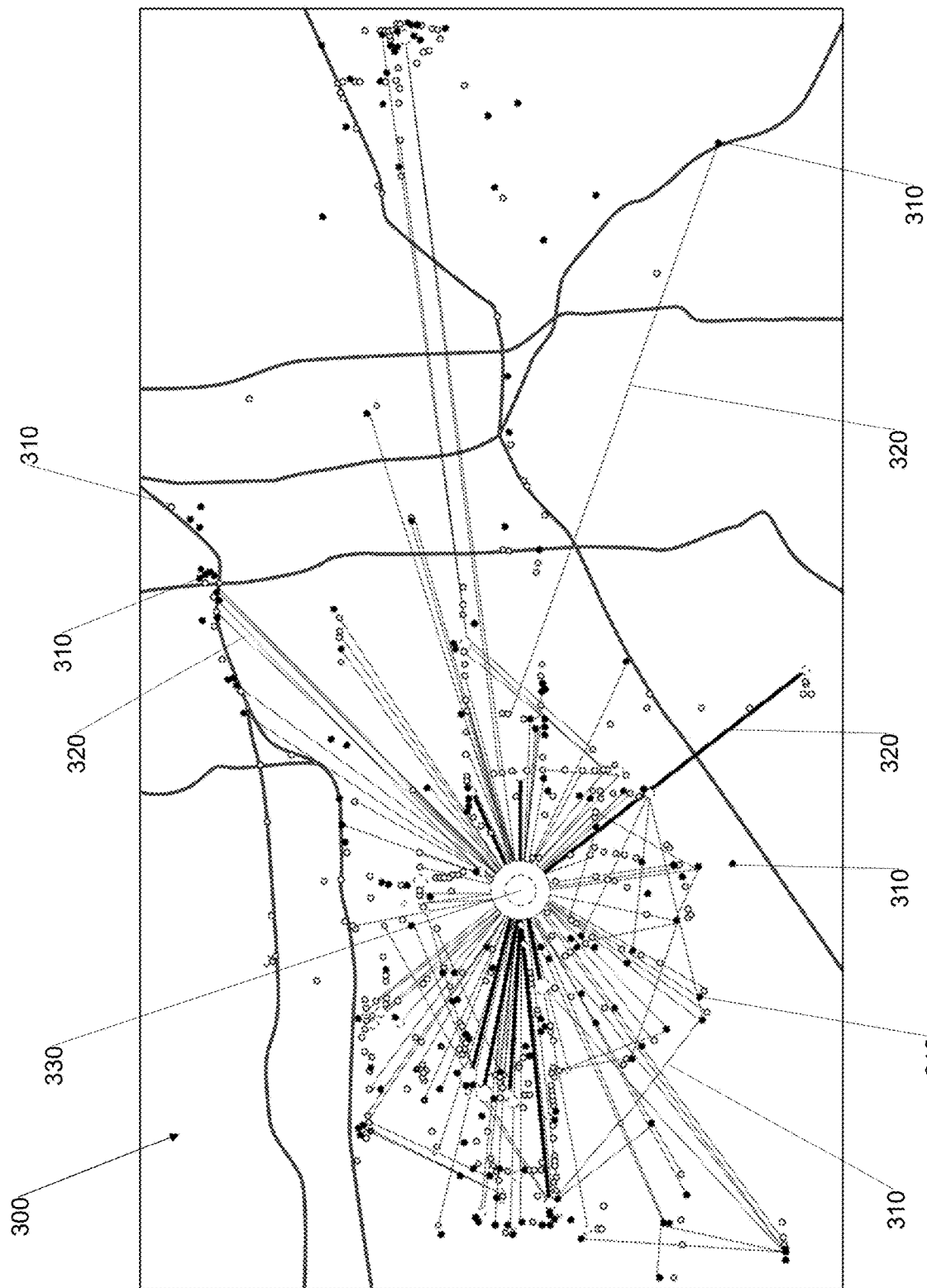
FIG. 3 is a diagram illustrating an exemplary mobility graph for the mobility pattern system in accordance with one or more aspects described herein.

FIG. 3 illustrates an exemplary mobility graph 300 for a user. The mobility pattern system 200 and/or the mobility pattern server 100 may generate a mobility graph 300, which may consist of defining areas of mobility using the mobility graph 300 built from location data from one or more users. The mobility graph 300 may consist of nodes 310 and edges 320. The nodes 310 may be constructed from the origins and destinations of the trajectories using spatial clustering techniques. The edges 320 between nodes 310 may be constructed based on the trips between the nodes 310 and may be given weights based on trip frequency. For example, two nodes 310 may be connected by an edge 320 if there is at least one trip between them.

As illustrated in FIG. 3, the nodes 310 or origins/destinations of the trips are represented by dots. The nodes 310 may be spatial clusters of destinations and then attached the closest origins. The origins may be captured when a user's in-vehicle device 240 is already in motion and above certain threshold speed, hence may not be used for defining the cluster locations. The nodes 310 may be visualized as filled-in disks of radius proportional with the weight. The weight may be defined as the number of destinations and origins in the cluster. The nodes 310 may also be colored based on weight. The large node 330 may correspond to a home location of the user or other important locations of a user, such as work. The edges 320 may have weight and size proportional with the number of trips between the corresponding nodes 310. The nodes 310 may represent locations where users stay for a certain time. The size of the nodes 310 may represent the number of times the user visited that destination. The size or thickness of the edges 320 may represent the number of times a trip was made between the origins and destinations of the corresponding nodes 310.

Due to the inaccuracies from the in-vehicle device 240, the usage behavior of the in-vehicle device 240 and the environments, there may be a large spectrum of positional error in the location data. The first step in understanding user behavior is to filter and/or cleanse this location data, consolidate the location data, and create a mobility graph 300. The filtering, consolidating, and creating a mobility graph 300 may include various algorithms and machine learning algorithms.

Figure 4:
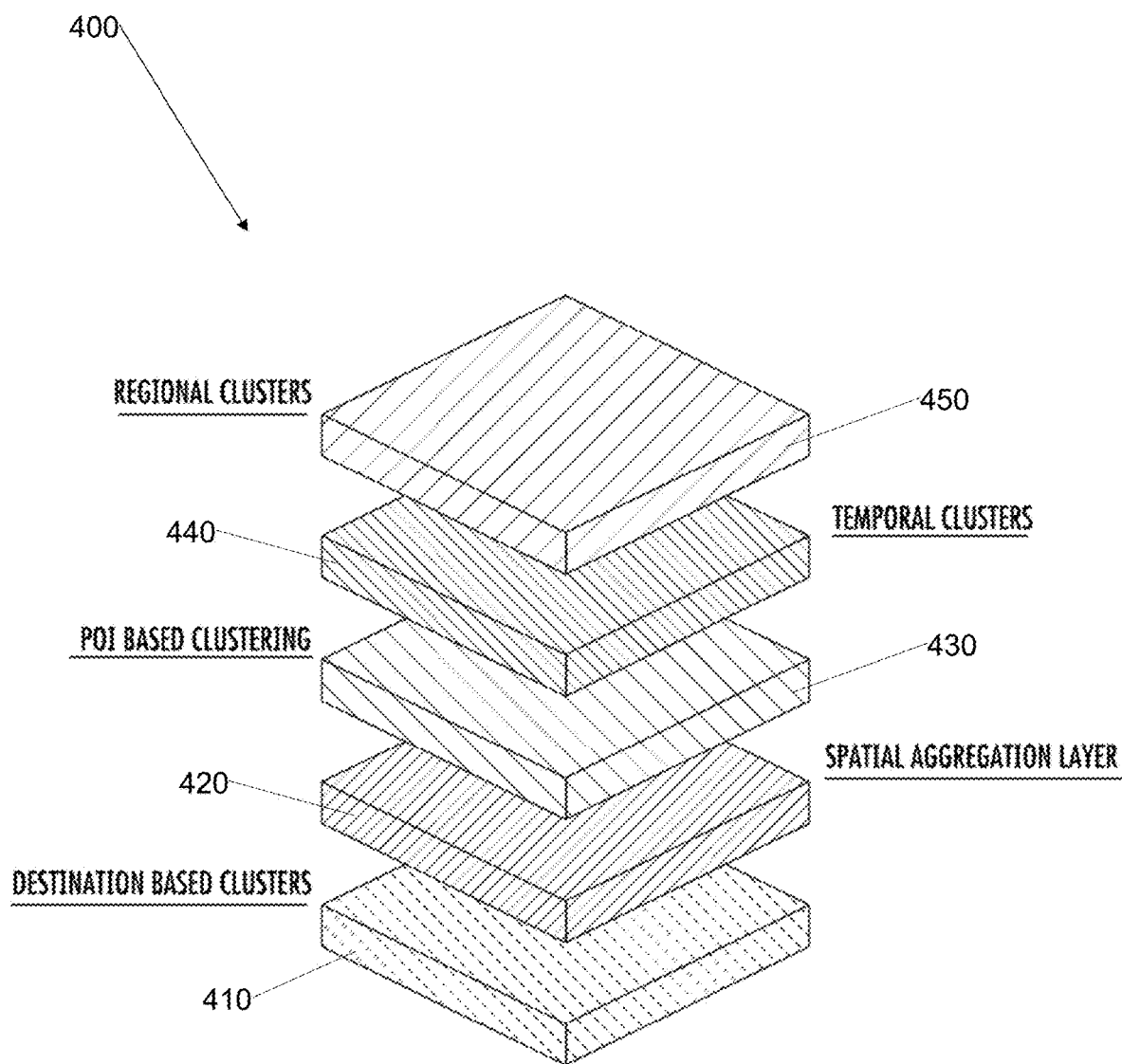
FIG. 4 is a block diagram illustrating various different types of clustering that may be used in the data aggregation stage of the mobility pattern system in accordance with one or more aspects described herein.

As a first step, the mobility pattern system 200 and/or the mobility pattern server 100 may aggregate the user's destinations and cluster them hierarchically at different levels. FIG. 4 illustrates various different types of clustering 400 that may be used in the data aggregation stage of the mobility pattern system 200 and/or the mobility pattern server 100. The meta data that goes along with each clustering level 400 enables the mobility pattern system 200 and/or the mobility pattern server 100 to build a variety of mobility graphs and derive semantics from this location data.

As illustrated in FIG. 4, the various layers of clusters 400 may include destination-based cluster level 410, spatial aggregation layer cluster level 420, point of interest (POI) cluster level 430, temporal cluster level 440, and regional cluster level 450. The various layers or levels of clusters 400 may be hierarchical.

Figure 5A:
FIGS. 5A and 5B are diagrams illustrating an example of destination-based clusters of the mobility pattern system in accordance with one or more aspects described herein.
Figure 5B:
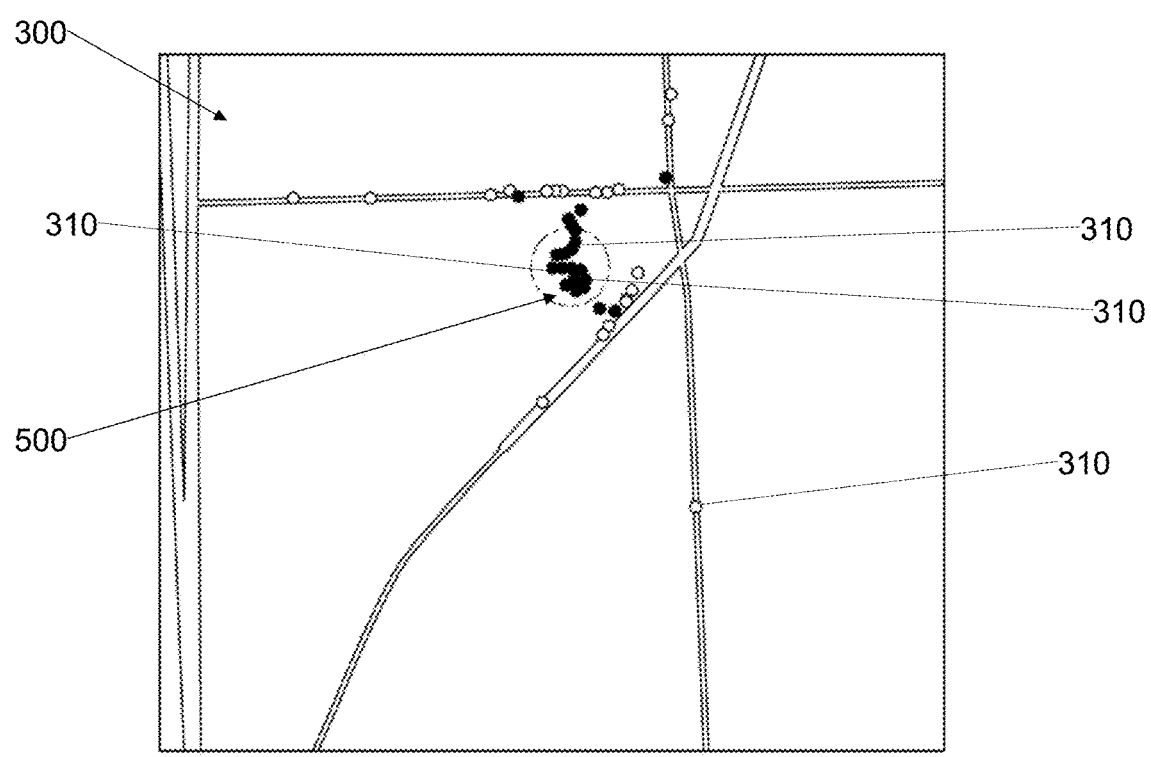

The destination-based cluster level 410 may include clusters that are based on closely spaced destinations within a given radius (e.g. 100 meters) and origins assigned to these destinations. FIGS. 5A and 5B illustrate an example of destination-based clusters 500. For example, FIGS. 5A and 5B illustrates a mobility graph 300 or portion of a mobility graph 300 with destination-based clustering 500. The mobility graph 300 in FIGS. 5A and 5B includes destination points or nodes 310 that are in close proximity and combined to a destination-based cluster 500 using a clustering technique, like density-based spatial clustering of applications with noise (DBSCAN). The destination-based clustering involves consolidating the nodes 310 or destinations around a particular location of interest into a destination-based cluster 500. The destination-based clustering may allow the mobility pattern system 200 and/or the mobility pattern server 100 to understand the specific purpose of travel around this destination-based cluster 500.

Figure 6:
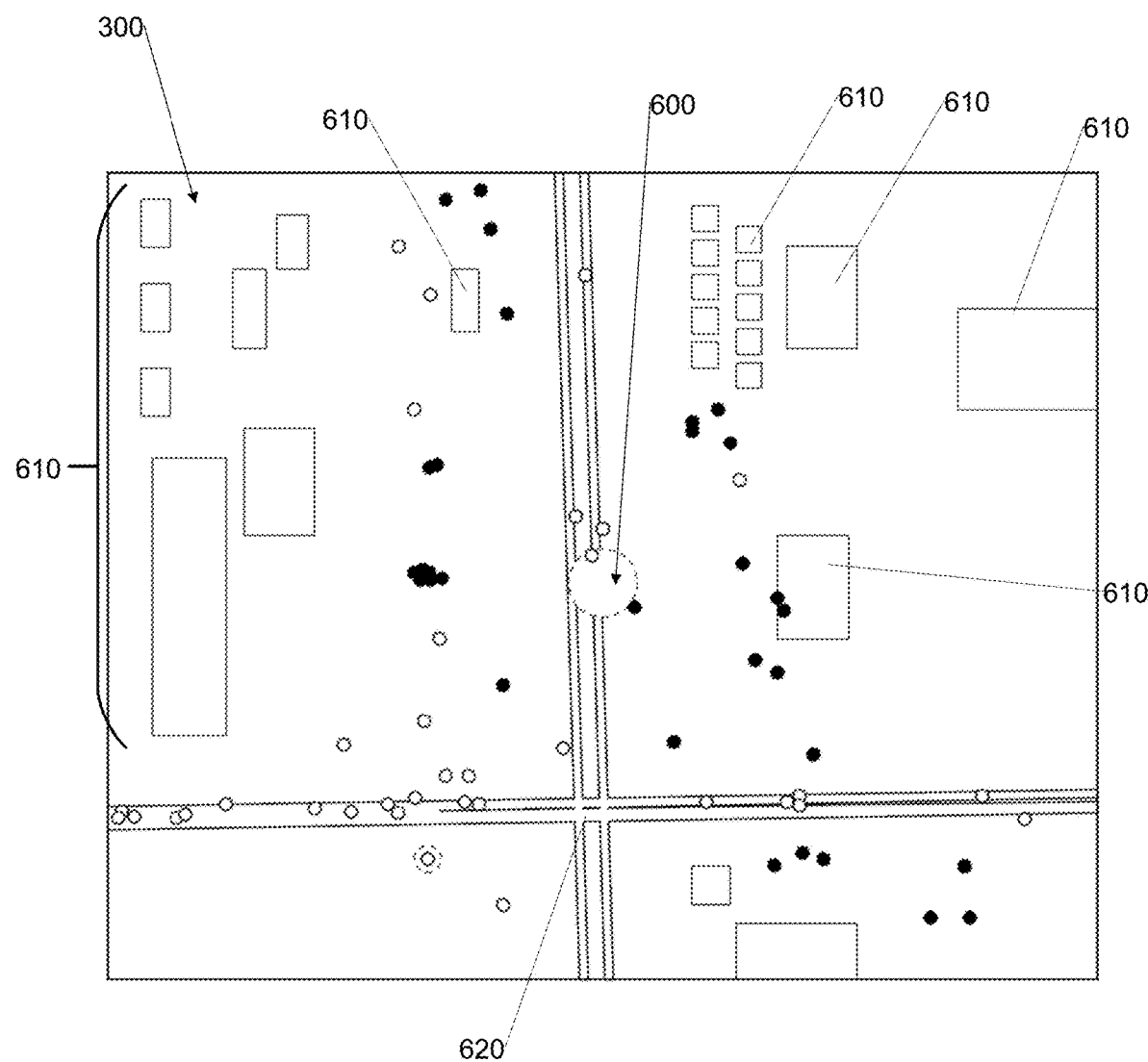
FIG. 6 is a diagram illustrating spatial aggregation layer clustering of the mobility pattern system in accordance with one or more aspects described herein.

FIG. 6 illustrates a mobility graph 300 or portion of a mobility graph 300 showing spatial aggregation layer clustering 600. The spatial aggregation layer cluster level 420 may include spatial aggregation clusters 600 based on a spatial distance of the destination-based clusters 500. The spatial aggregation clustering level 420 may combine destination-based clusters 500 and may help to identify the users' mobility to a specific region and specifically as spatial aggregation clusters 600. For example, the mobility pattern system 200 and/or the mobility pattern server 100 may identify users travelling to spatial aggregation clusters 600, such as a strip mall 610 or an intersection 620 of several commercial outlets in this layer. The spatial aggregation clusters 600 may allow the mobility pattern system 200 and/or the mobility pattern server 100 to understand the user's mobility to the town or region of user's neighborhood. FIG. 6 illustrates this example of higher level spatial clustering aggregation.

FIGS. 7A and 7B illustrate a mobility graph 300 or portion of a mobility graph 300 showing points of interest (POI) clustering 700. The POI cluster level 430 may include POI clusters 700 from aggregation of nodes 310 and/or destination-based clusters 500 based on map features, such as POI clusters 700 combined based on, for example, POIs, airports, shopping malls, schools, or sports arenas. As illustrated in FIGS. 7A and 7B, the POI clusters 700 combines visits to a larger POI, like an airport 710 or a shopping mall. Rather than viewing the mobility of the user to individual entry points, the mobility pattern system 200 and/or the mobility pattern server 100 can classify the user as a frequent traveler to a specific destination. Using a map database, FIG. 7A illustrates combining a user visits and nodes 310 to multiple terminals in an airport 710 and aggregating those locations into the one POI cluster 700 as specifically illustrated in FIG. 7B.

The temporal cluster level 440 may determine and identify clusters based on a time of day and/or day of the week (e.g. weekday, weekend, daytime, nighttime). Once the data is clustered at these hierarchical levels, the various clusters and nodes can also be split into different layers based on temporal filtering and by temporal clustering 440. All of these clusters and the mobility graph can be built based on time of day, weekday-weekend or seasonality, as selected or identified by the user. The temporal cluster level 440 may allow the mobility pattern system 200 and/or the mobility pattern server 100 to focus down to the user (or users in various regions) mobility behavior from several dimensions and apply the results to the areas of interest.

The regional cluster level 450 may include aggregated clusters based on the frequency used destinations for users in a zip code or other regional measurements, such as towns, cites, counties, and/or states.

Region of Mobility

A region of mobility may be defined as a homogenous spatial region that includes collections of nodes and edges that satisfies certain location criteria. The location criteria may be defined based on the frequency of visit, time of visit, length of stay at each location or the type of locations visited. These parameters may enable the mobility pattern system 200 and/or the mobility pattern server 100 to create several regions of mobility, and these parameters can be defined based on the insights to be derived for a service offering.

Figure 8:
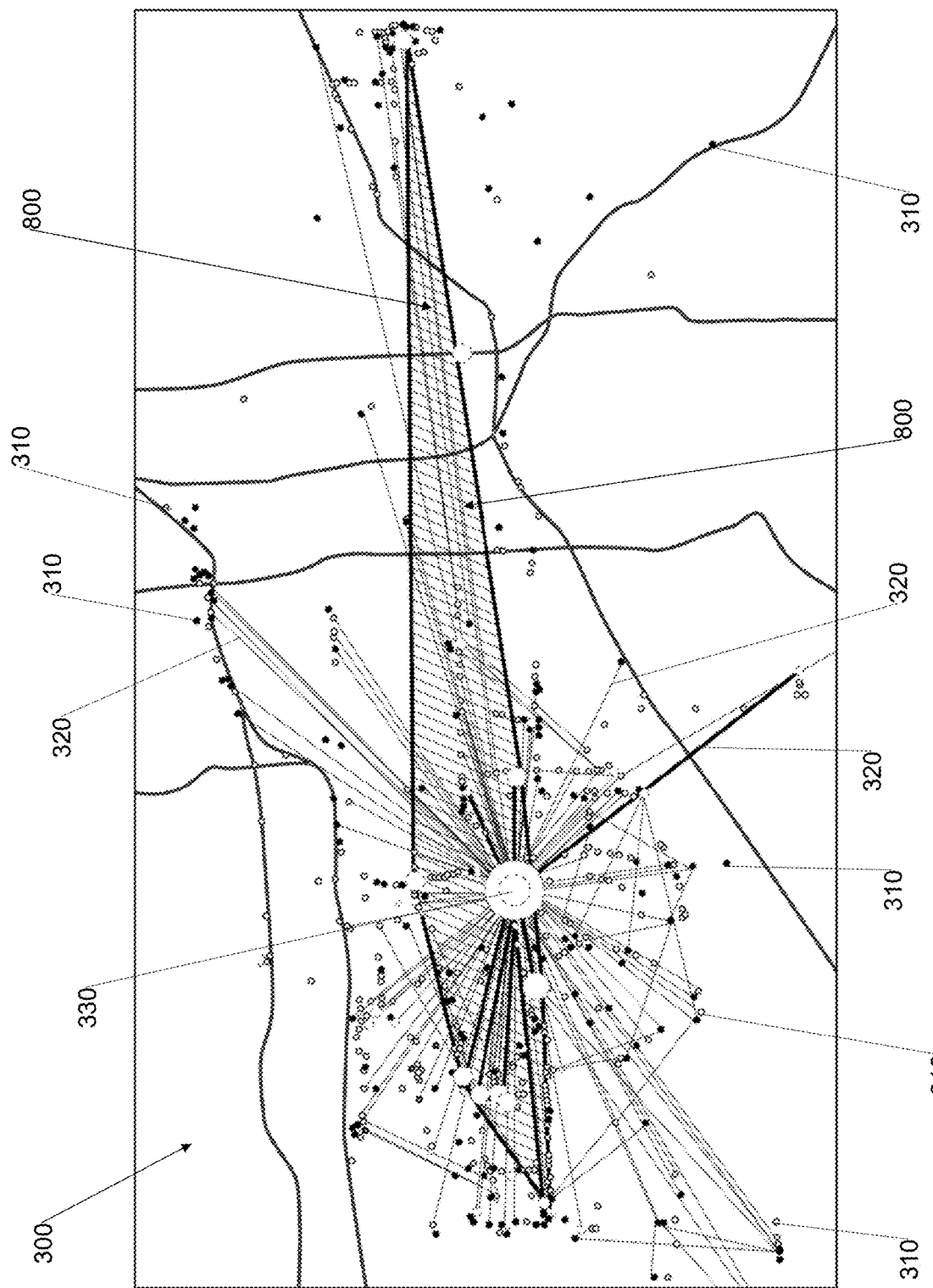
FIG. 8 is a diagram illustrating a mobility graph defining a region of mobility of the mobility pattern system in accordance with one or more aspects described herein.

In an exemplary embodiment, and as illustrated in FIG. 8, a mobility graph 300 illustrates a user's home area. The user's home area can be defined as a region of mobility 800 (shaded polygon) around the home location 330 of the user that includes most frequent destinations. FIG. 8 illustrates the home region of mobility 800 derived for a user based on various these parameters, such as with a minimum of one hour of stay over a six-month period. The mobility pattern system 200 and/or the mobility pattern server 100 may identify and define a boundary of a user's home region of mobility 800 that may include locations like grocery stores, gyms, daycares, work locations, etc. The footprint defined by this home region of mobility 800 can be used to understand the potential areas of interest, services that are relevant for this user and the risks that are associated with travel in this region. As further illustrated in FIG. 8, the mobility pattern system 200 and/or the mobility pattern server 100 may be defined as a home region of mobility 800 on the mobility graph 300. In this example, the home region of mobility 800 may be defined as the convex hull of the nodes 310 and the edges 320 that have weight and size above certain threshold, corresponding to most frequent stays and trips.

This region of mobility 800 may be used by an insurance industry to assess the travel risks associated with this user, by a telematics service company to offer major traffic related alerts in this region and so on. The region of mobility 800 may also be sliced into weekday vs weekend regions, day vs night regions, etc. to offer refined services.

Another region of mobility 800 may also be defined around the work location of the users. The user's work location may be first identified algorithmically or provided by the user. A region of mobility 800 around the work location may help identify the frequently visited restaurants, lunch spots, errands needed for workers in the region, etc. A service provider may benefit from this region of mobility 800 of the users to identify targeted services.

Another region of mobility 800 may also be created around popular destinations, or points of interest. For example, using the destination data for a group of users visiting a state park, the availability or lack of facilities within a given boundary may be determined for planning and for small business offering purposes.

Figure 9:
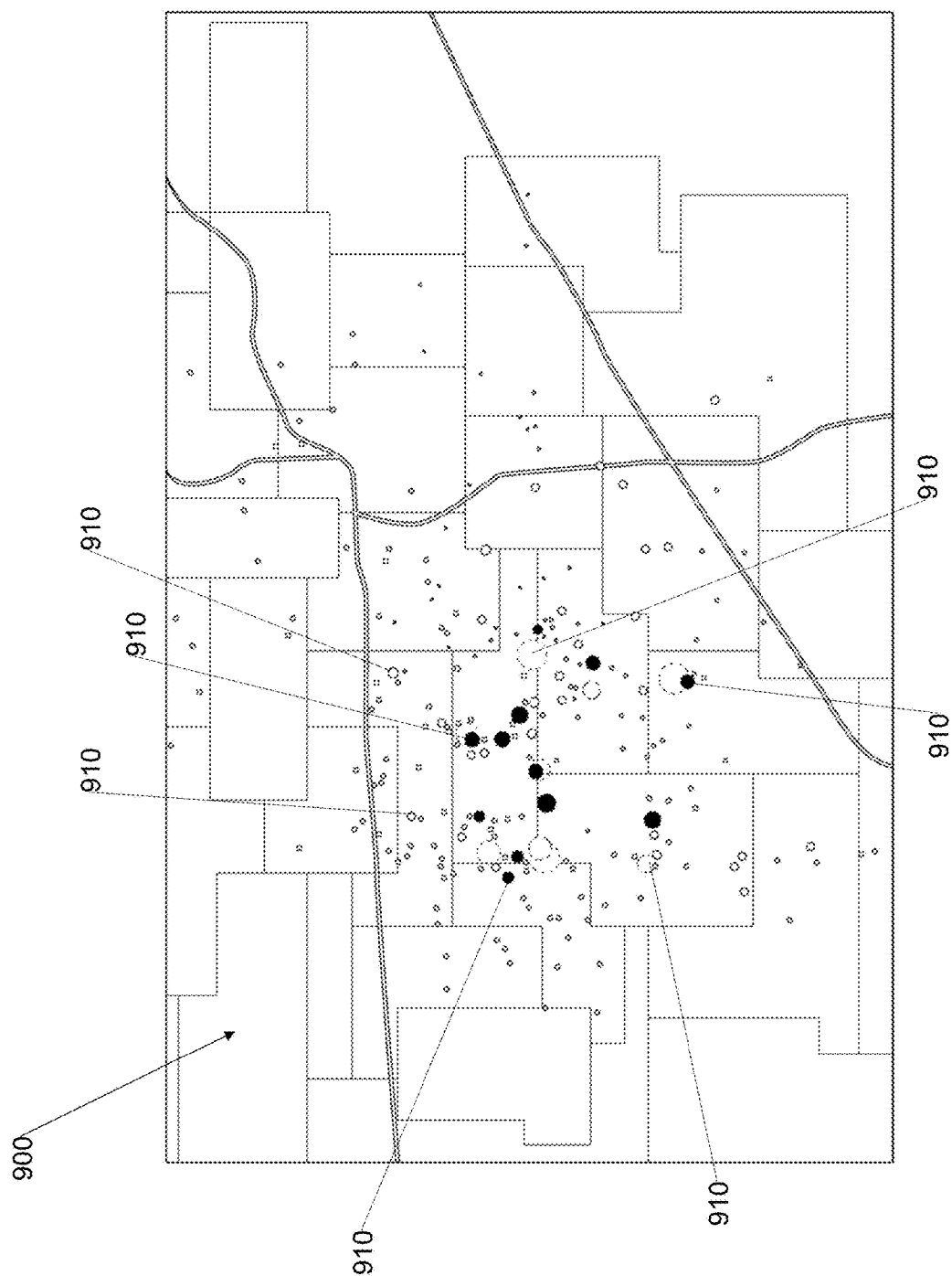
FIG. 9 is a diagram illustrating an aggregate region of mobility of the mobility pattern system in accordance with one or more aspects described herein.

In another embodiment, as illustrated in FIG. 9, the mobility pattern system 200 and/or the mobility pattern server 100 may be utilized to build an aggregate region of mobility 900 for a homogenous collection of users. FIG. 9 specifically illustrates the aggregate region of mobility 900 for the home region of all users living in a particular zip code. A collection of users may be defined for example, as the people living in a particular zip code. The collection of users and zip codes may be obtained based on the garage address used in their insurance policies or from other public data sources. The aggregate region of mobility 900 may be a homogenous collection of nodes 910 and edges in an aggregate mobility graph. The aggregate mobility graph may be constructed from individual user mobility graphs by clustering most frequently visited nodes 910 and building the edges between the nodes 910 based on aggregating the trips between them. FIG. 9 illustrates an aggregate home region of mobility 900 corresponding to all the users with garage address in a zip code. The filled-in disks define spatial clusters of nodes from users that satisfy certain criteria, such as stay frequency, duration, and over/under certain thresholds. The aggregate home region of mobility may be defined in this case as the convex hull of all such nodes. The aggregate home region of mobility 900 may be used to understand the risk profile of users in a zip code by combining demographic data of all zip codes within the region of mobility.

The mobility pattern system 200 and/or the mobility pattern server 100 and region of mobility may be utilized to solve various problems. For example, the mobility pattern system 200 and/or the mobility pattern server 100 and region of mobility in combination with risk maps may be used for risk index calculation and for insurance pricing both at an individual level and an aggregate level. In another example, the mobility pattern system 200 and/or the mobility pattern server 100 and region of mobility may quantify the changes in mobility patterns due to certain events. Further, the mobility pattern system 200 and/or the mobility pattern server 100 and region of mobility may be utilized for discovering and quantifying types of users based on the size and density of the regions of mobility.

Figure 10:
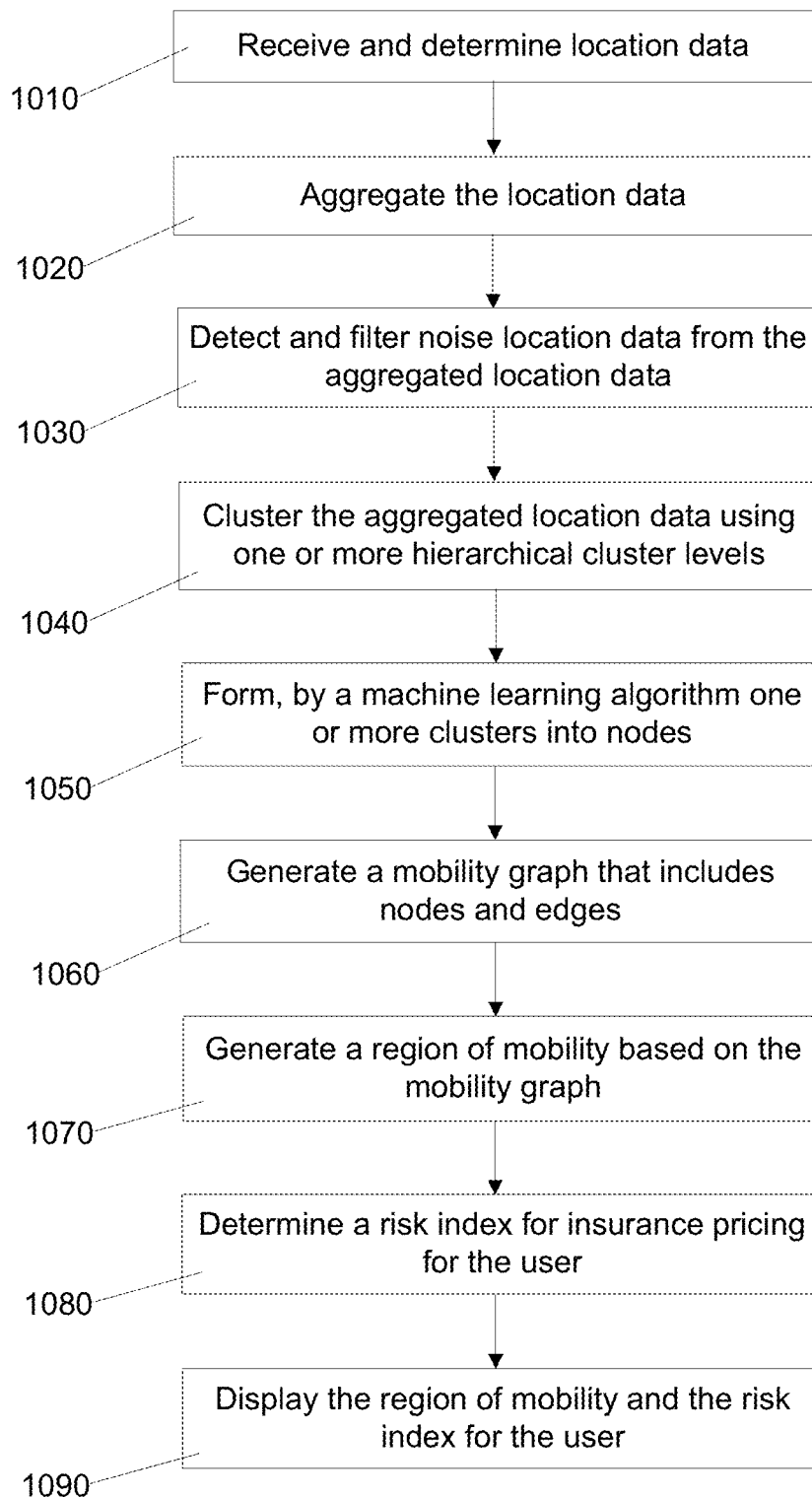
FIG. 10 illustrates an exemplary method for the mobility pattern system in accordance with one or more aspects described herein.

FIG. 10 illustrates an example method 1000 according to an embodiment as disclosed herein. In some embodiments, method 1000 may be performed by the mobility pattern system 200 and/or the mobility pattern server 100. It should be understood that the method of FIG. 10 is designed to illustrate various features and aspects of the system, and not to limit the functionality of the system.

At step 1010, the mobility pattern system 200 and/or the mobility pattern server 100 may receive and determine location data. The location data may include a plurality of trips by a user between a plurality of origins and a plurality of destinations. The location data may be received from one or more sensors from a mobile device for the user. At step 1020, the mobility pattern system 200 and/or the mobility pattern server 100 may aggregate the location data.

At step 1030, the mobility pattern system 200 and/or the mobility pattern server 100 may detect and filter noise location data from the aggregated location data. The noise location data may comprise environmental noise data and/or inaccuracies from the location data, such as sensor inaccuracies.

At step 1040, the mobility pattern system 200 and/or the mobility pattern server 100 may cluster the aggregated location data using one or more hierarchical cluster levels. The one or more hierarchical cluster levels may include one or more of the following: a destination-based cluster level, a spatial aggregation layer cluster level, a temporal cluster level, a point of interest based cluster level, or a regional cluster level.

At step 1050, the mobility pattern system 200 and/or the mobility pattern server 100 may form, by a machine learning algorithm, one or more location clusters into nodes from the aggregated location data. The forming of the location clusters may be based the one or more hierarchical cluster levels.

At step 1060, the mobility pattern system 200 and/or the mobility pattern server 100 may generate a mobility graph that includes nodes and edges. The nodes may be defined from the one or more location clusters. The edges may be defined by each of the plurality of trips between one of the plurality of origins and one of the plurality of destinations. Each of the plurality of nodes may include a node weight that defines a location frequency that the user visits a specific location associated with each of the plurality of nodes. The node weight may be larger when the location frequency is more frequent or higher. Additionally, the node weight may be smaller when the location frequency is less frequent or lower. Each of the plurality of edges may include an edge weight based on a trip frequency. The edge weight may be bigger, thicker, or larger when the trip frequency is more frequent or higher. Additionally, the edge weight may be smaller or thinner when the trip frequency is less frequent or lower.

At step 1070, the mobility pattern system 200 and/or the mobility pattern server 100 may generate a region of mobility based on the mobility graph. The region of mobility may be defined as a convex hull of the plurality of nodes with the node weight above a node threshold and the plurality of edges with the edge weight or size above an edge threshold. The region of mobility may also be defined as a homogeneous spatial region based on a specific location included with the plurality of nodes and the plurality of edges that meet a location criteria. The region of mobility may be a home mobility region defined as the region of mobility around a home location of the user. The region of mobility may be a work mobility region defined as the region of mobility around a work location of the user. The region of mobility may be a point of interest mobility region defined as the region of mobility around a specific point of interest for the user. Additionally, the region of mobility may be based on location criteria that includes one or more of: a frequency of visit, a time of visit, a length of stay at each specific location, or a type of location visited.

At step 1080, the mobility pattern system 200 and/or the mobility pattern server 100 may determine a risk index for the user based on the region of mobility of the user. The risk index may be used for insurance pricing for the user.

At step 1090, the mobility pattern system 200 and/or the mobility pattern server 100 may cause display the region of mobility and the risk index for the user. A display with a user interface connected to the mobility pattern system 200 and/or the mobility pattern server 100 may display the region of mobility and the risk index for the user.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
   a processor;
   a display with a user interface; and
   a memory unit storing computer-executable instructions, which when executed by the processor, cause the system to:
   receive location data that includes a plurality of trips by a user between a plurality of origins and a plurality of destinations;
   form, by a machine learning algorithm operating on the processor, one or more clusters of nodes based on a singular shared cluster type, wherein each cluster is a different hierarchical level;
   generate a mobility graph that includes at least one of the cluster of nodes and respective edges and the respective edges are defined by a portion of the plurality of trips based on the cluster of nodes;
   generate a region of mobility based on the mobility graph, wherein the region of mobility is a spatial region based on the cluster of nodes and the respective edges; and
   cause to display, at a graphical interface, the region of mobility for the user.

2. The system of claim 1, wherein display, via the user interface, the plurality of nodes and the plurality of edges, the plurality of nodes having displayed sizes corresponding to location frequencies for the plurality of nodes, and the plurality of edges having displayed edge weights corresponding to trip frequencies between nodes defining the plurality of edges.

3. The system of claim 1, wherein causing the user interface to present the mobility graph or the region of mobility at the display includes presenting the mobility graph or the region of mobility at an in-vehicle device by processing and presenting the location data in real-time.

4. The system of claim 1, wherein the plurality of nodes are visualized as filled-in disks with a radius proportional to a number of destinations and origins in the one or more location clusters.

5. The system of claim 1, wherein the plurality of nodes includes a node size that defines a location frequency of the user visiting specific locations, wherein the node size is larger when the location frequency is more frequent and the node size is smaller when the location frequency is less frequent.

6. The system of claim 1, wherein the plurality of edges includes an edge weight based on a trip frequency, wherein the edge weight is larger when the trip frequency is more frequent and the edge weight is smaller when the trip frequency is less frequent.

7. The system of claim 1, wherein the plurality of nodes have a color based on a weight defined by a trip frequency.

8. The system of claim 1, wherein a node of the plurality of nodes is a large node based on the node being associated with a home location of the user.

9. The system of claim 1, wherein the region of mobility is a home mobility region defined as the region of mobility around a home location of the user.

10. The system of claim 1, wherein the region of mobility is a work mobility region defined as the region of mobility around a work location of the user.

11. A computer-implemented method comprising:
    receive, by a processor and a memory unit storing computer-executable instructions operating on a computing system, location data that includes a one or more trips by a user between one or more origins and one or more destinations;
    form, by a machine learning algorithm operating on the processor, one or more clusters of nodes based on a singular shared cluster type, wherein each cluster is a different hierarchical level;
    generate a mobility graph that includes at least one of the cluster of nodes and respective edges and the respective edges are defined by a portion of the one or more of trips based on the cluster of nodes;
    generate a region of mobility based on the mobility graph, wherein the region of mobility is a spatial region based on the cluster of nodes and the respective edges; and
    cause to display, at a graphical interface, the region of mobility for the user.

12. The computer-implemented method of claim 11, wherein causing the user interface to present the mobility graph and the region of mobility includes presenting the cluster of nodes with displayed sizes corresponding to location frequencies for the cluster of nodes.

13. The computer-implemented method of claim 11, wherein the singular cluster type is point-of-interest (POI) based, further comprising:
    aggregating nodes that share a POI, and wherein a node of the cluster of nodes is presented as larger than other nodes based on the aggregated nodes being associated with the POI that is more frequented.

14. The computer-implemented method of claim 11, wherein the singular cluster type is region based, further comprising:
    aggregating nodes that share a region, and wherein the cluster of nodes includes a node size that defines a location frequency of the user visiting specific locations.

15. The computer-implemented method of claim 11, wherein the region of mobility is a spatial region based on the cluster of nodes and the respective edges that meet a location criteria, and wherein the location criteria comprises one or more of: a frequency of visit, a time of visit, a length of stay at a specific location, or a type of location visited.

16. The computer-implemented method of claim 11, wherein a node size of the cluster of nodes is larger when a location frequency is more frequent and the node size is smaller when the location frequency is less frequent.

17. The computer-implemented method of claim 11, wherein the cluster of edges includes an edge weight based on a trip frequency with the edge weight being larger when the trip frequency is more frequent and the edge weight being smaller when the trip frequency is less frequent.

18. One or more non-transitory computer-readable media storing instructions that, when executed by a computing device, cause the computing device to:
   receive, by a processor operating on the computing device, location data that includes a plurality of trips by a user between a plurality of origins and a plurality of destinations;
   form, by a machine learning algorithm operating on the processor, one or more clusters of nodes based on a singular shared cluster type, wherein each cluster is a different hierarchical level;
   generate a mobility graph that includes at least one of the cluster of nodes and respective edges and the respective edges are defined by a portion of the plurality of trips based on the cluster of nodes;
   generate a region of mobility based on the mobility graph, wherein the region of mobility is a spatial region based on the cluster of nodes and the respective edges; and
   cause to display, at a graphical interface, the region of mobility for the user.

19. The one or more non-transitory computer-readable media storing instructions of claim 18, wherein the region of mobility is at least one of:
   a home mobility region defined as the region of mobility around a home location of the user;
   a work mobility region defined as the region of mobility around a work location of the user; or
   a point of interest mobility region defined as the region of mobility around a specific point of interest for the user.

20. The one or more non-transitory computer-readable media storing instructions of claim 18, wherein the region of mobility is based on location criteria that includes one or more of: a frequency of visit;
   a time of visit;
   a length of stay at a specific location; or
   a type of location visited.

* * * * *